(12) United States Patent
Burton et al.

(10) Patent No.: US 9,309,807 B2
(45) Date of Patent: Apr. 12, 2016

(54) COMBUSTION CHAMBER CONSTRUCTIONS FOR OPPOSED-PISTON ENGINES

(75) Inventors: Tristan M. Burton, San Francisco, CA (US); Fabien G. Redon, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 52 days.

(21) Appl. No.: 14/117,831

(22) PCT Filed: May 16, 2012

(86) PCT No.: PCT/US2012/038061
§ 371 (c)(1),
(2), (4) Date: Nov. 14, 2013

(87) PCT Pub. No.: WO2012/158756
PCT Pub. Date: Nov. 22, 2012

(65) Prior Publication Data
US 2014/0083396 A1   Mar. 27, 2014

Related U.S. Application Data

(60) Provisional application No. 61/519,194, filed on May 18, 2011.

(51) Int. Cl.
*F02B 31/00* (2006.01)
*F02B 75/28* (2006.01)
(Continued)

(52) U.S. Cl.
CPC . *F02B 75/28* (2013.01); *F01B 7/02* (2013.01); *F02B 23/0675* (2013.01); *F02B 25/08* (2013.01); *Y02T 10/125* (2013.01)

(58) Field of Classification Search
CPC ............. F02B 75/28; F02B 2075/125; F02B 2275/48; F02B 23/0675; F02B 25/08; F02F 3/00; F02F 3/26; F02F 3/28; F01B 7/02; Y02T 10/125
USPC ................. 123/51 R, 51 BD, 301, 295, 193.6
See application file for complete search history.

(56) References Cited

U.S. PATENT DOCUMENTS 665,475 A   1/1901   Schweitzer
667,298 A   2/1901   Cunningham
(Continued)

FOREIGN PATENT DOCUMENTS

BE   388676   5/1932
DE   4335515 A1   4/1995   ............. F02B 17/00
(Continued)

OTHER PUBLICATIONS

Hofbauer, P., *SAE Publication 2005-014548*, "Opposed Piston Opposed Cylinder (opoc) Engine for Military Ground Vehicles," Apr. 2005.

(Continued)

*Primary Examiner* — Marguerite McMahon
(74) *Attorney, Agent, or Firm* — Terrance A. Meador

(57) ABSTRACT

An opposed-piston engine includes a ported cylinder and a pair of pistons disposed to reciprocate in the bore of the cylinder. A combustion chamber is defined by opposing shaped piston end surfaces as the pistons approach respective top dead center (TDC) locations in the bore. At the end of scavenging, the shaped end surfaces of the pistons interact with swirl to produce turbulence in the charge air motion in the combustion chamber; the additional bulk motions include tumble. Fuel is injected into the turbulent charge air motion along a major axis, of the combustion chamber.

13 Claims, 15 Drawing Sheets

(51) Int. Cl.
*F01B 7/02* (2006.01)
*F02B 23/06* (2006.01)
*F02B 25/08* (2006.01)

(56) References Cited

U.S. PATENT DOCUMENTS

| | | | |
|---|---|---|---|
| 673,160 | A | 4/1901 | Diesel |
| 1,143,408 | A | 6/1915 | Kramer |
| 1,207,799 | A | 12/1916 | Scheller |
| 1,312,604 | A | 8/1919 | Wygodsky |
| 1,423,088 | A | 7/1922 | Crossley et al. |
| 1,464,268 | A | 8/1923 | Otto |
| 1,486,583 | A | 3/1924 | Huskisson |
| 1,515,391 | A | 11/1924 | Otto |
| 1,523,453 | A | 1/1925 | Scott |
| 1,582,792 | A | 4/1926 | Schultz |
| 1,644,954 | A | 10/1927 | Shearer |
| 1,662,828 | A | 3/1928 | Law |
| 1,808,664 | A | 6/1931 | Koschka |
| 1,853,562 | A | 4/1932 | Herr |
| 1,854,190 | A | 4/1932 | Herr |
| 1,967,630 | A | 7/1934 | Rusberg |
| 1,978,194 | A | 10/1934 | Gray |
| 2,014,672 | A | 9/1935 | Schmaljohann |
| 2,110,116 | A | 3/1938 | Heraclio |
| 2,132,083 | A | 10/1938 | Pateras |
| 2,173,081 | A | 9/1939 | Barkeij |
| 2,196,429 | A | 4/1940 | Siciliano |
| 2,337,245 | A | 12/1943 | Jacklin |
| 2,393,085 | A | 1/1946 | Wuehr |
| 2,396,429 | A | 3/1946 | Krygsman |
| 2,440,310 | A | 4/1948 | Thege |
| 2,463,418 | A | 3/1949 | Pescara |
| 2,530,884 | A | 11/1950 | Laraque |
| 2,607,328 | A | 8/1952 | Jencick |
| 2,646,779 | A | 7/1953 | Fiser |
| 2,682,862 | A | 7/1954 | Camnar |
| 2,699,156 | A | 1/1955 | Karrow |
| 2,731,003 | A | 1/1956 | Morris |
| 2,748,757 | A | 6/1956 | Morris |
| 2,805,654 | A | 9/1957 | Jacklin |
| 2,853,983 | A | 9/1958 | Sawle |
| 3,033,184 | A | 5/1962 | Jackson |
| 3,117,566 | A | 1/1964 | Venediger |
| 3,411,289 | A | 11/1968 | Antonsen et al. ............ 60/13 |
| 4,090,479 | A | 5/1978 | Kaye |
| 4,452,221 | A | 6/1984 | Keating |
| 4,491,096 | A | 1/1985 | Noguchi et al. |
| 4,872,433 | A | 10/1989 | Paul |
| 5,042,441 | A | 8/1991 | Paul et al. ............ 123/276 |
| 5,083,530 | A | 1/1992 | Rassey ............ 123/51 R |
| 5,261,359 | A | 11/1993 | Hull ............ 123/65 V |
| 6,161,518 | A | 12/2000 | Nakakita et al. ............ 123/298 |
| 6,170,443 | B1 | 1/2001 | Hofbauer ............ 123/51 B |
| 6,182,619 | B1 | 2/2001 | Spitzer ............ 123/51 B |
| 6,345,601 | B1 | 2/2002 | Miyajima et al. ............ 123/305 |
| 6,443,122 | B1 | 9/2002 | Denbratt et al. |
| 6,854,440 | B2 | 2/2005 | Cathcart et al. ............ 123/298 |
| 6,874,489 | B2 | 4/2005 | Yonekawa et al. ............ 123/661 |
| 6,928,997 | B2 | 8/2005 | Yu ............ 123/657 |
| 6,997,158 | B1 | 2/2006 | Liu ............ 123/279 |
| 7,210,448 | B2 | 5/2007 | Stanton et ............ 123/298 |
| 7,284,524 | B2 | 10/2007 | Matas et al. |
| 7,438,039 | B2 | 10/2008 | Poola et al. ............ 123/193.6 |
| 7,597,084 | B2 | 10/2009 | Vachon et al. ............ 123/294 |
| 8,549,854 | B2 | 10/2013 | Dion et al. |
| 8,677,950 | B2 * | 3/2014 | Hofbauer ............ 123/51 R |
| 8,800,528 | B2 | 8/2014 | Fuqua et al. |
| 8,820,294 | B2 | 9/2014 | Fuqua et al. |
| 2005/0066929 | A1 | 3/2005 | Liu ............ 123/193.4 |
| 2005/0150478 | A1 | 7/2005 | Nomura ............ 123/305 |
| 2006/0124084 | A1 | 6/2006 | Hofbauer et al. ............ 123/55.7 |
| 2006/0157003 | A1 | 7/2006 | Lemke et al. ............ 123/41.38 |
| 2007/0272191 | A1 | 11/2007 | Tsujimoto et al. ............ 123/193.5 |
| 2008/0006238 | A1 | 1/2008 | Hofbauer et al. ............ 123/208 |
| 2008/0115771 | A1 | 5/2008 | Elsbett ............ 123/51 BA |
| 2008/0127947 | A1 | 6/2008 | Hofbauer et al. ............ 123/51 R |
| 2009/0139485 | A1 | 6/2009 | Pontoppidan ............ 123/305 |
| 2009/0159022 | A1 | 6/2009 | Chu ............ 123/52.2 |
| 2010/0006061 | A1 | 1/2010 | Shibata et al. ............ 123/307 |
| 2010/0107868 | A1 | 5/2010 | Scharp et al. ............ 92/159 |
| 2010/0108044 | A1 | 5/2010 | Liu ............ 123/664 |
| 2010/0224162 | A1 | 9/2010 | Hofbauer ............ 123/196 R |
| 2010/0282219 | A1 | 11/2010 | Alonso ............ 123/51 AA |
| 2011/0041684 | A1 | 2/2011 | Kortas et al. ............ 92/255 |
| 2011/0271932 | A1 | 11/2011 | Fuqua et al. ............ 123/301 |
| 2012/0073526 | A1 | 3/2012 | Dion et al. |
| 2012/0073541 | A1 | 3/2012 | Fuqua et al. |
| 2012/0125298 | A1 | 5/2012 | Lemke et al. |
| 2012/0192831 | A1 | 8/2012 | Tusinean |
| 2012/0234285 | A1 | 9/2012 | Venugopal et al. ............ 123/193.6 |
| 2012/0285418 | A1 | 11/2012 | Elsbett et al. ............ 123/300 |
| 2013/0014718 | A1 | 1/2013 | Shen et al. |
| 2013/0036999 | A1 | 2/2013 | Levy et al. |
| 2013/0104848 | A1 | 5/2013 | Klyza et al. |
| 2013/0213342 | A1 | 8/2013 | Burton et al. ............ 123/193.6 |
| 2014/0014063 | A1 | 1/2014 | Redon ............ 123/295 |
| 2015/0033736 | A1 | 2/2015 | Kalebjian et al. |

FOREIGN PATENT DOCUMENTS

| | | | |
|---|---|---|---|
| DE | 19651175 | 6/1998 | ............ F02B 25/08 |
| DE | 10141888 | 4/2003 | ............ F02B 3/02 |
| DE | 102004010361 A1 | 12/2004 | ............ F02B 75/28 |
| DE | 102006055251 A1 | 5/2008 | ............ F02F 3/10 |
| DE | 102008055911 A1 | 5/2010 | ............ F02F 3/22 |
| FR | 848994 | 6/1939 | |
| GB | 191409948 | 4/1915 | |
| GB | 320439 | 10/1929 | |
| GB | 531366 | 1/1941 | |
| GB | 540658 A | 10/1941 | |
| GB | 552758 A | 4/1943 | |
| GB | 562343 | 6/1944 | |
| GB | 2493260 | 1/2013 | |
| JP | 52004909 A | 1/1977 | ............ F02B 23/08 |
| JP | 2009-138718 | 6/2009 | ............ F02D 19/12 |
| SU | 1216394 | 3/1986 | ............ F02B 41/04 |
| WO | WO-99/58830 | 11/1999 | |
| WO | 01/25618 A1 | 4/2001 | ............ F02M 59/08 |
| WO | WO-02/48524 A1 | 6/2002 | |
| WO | WO-2006/105390 A1 | 10/2006 | |
| WO | 2007/006469 A2 | 1/2007 | ............ F01L 7/04 |
| WO | 2009/061873 A1 | 5/2009 | ............ F02B 75/24 |
| WO | 2011/061191 | 5/2011 | ............ F01B 7/02 |
| WO | WO-2011/139332 A1 | 11/2011 | |
| WO | WO-2012/023970 A2 | 2/2012 | |
| WO | WO-2012/023975 A1 | 2/2012 | |
| WO | 2012/158756 A1 | 11/2012 | ............ F02B 75/28 |

OTHER PUBLICATIONS

Franke, M., *SAE Publication 2006-01-0277*, "Opposed Piston Opposed Cylinder (opoc) 450 Engine: Performance Development by CAE Simulations and Testing," M. Franke, et al, Apr. 2006.
Hirsch, N.R., et al, *SAE Publication 2006-01-0926*, "Advanced Opposed Piston Two-stroke Diesel Demonstrator," Apr. 2006.
Pirault, J-P., et al, *Opposed Piston Engines: Evolution, Use, and Future Applications*, 2010, pp. 231-245.
International Search Report/Written Opinion for PCT/US2011/000692, mailed Aug. 18, 2011.
International Search Report/Written Opinion for PCT/US2011/001436, mailed Nov. 3, 2011.
International Search Report/Written Opinion for PCT/US2012/038061, mailed May 16, 2012.
International Search Report/Written Opinion for PCT/US2011/061381, mailed Apr. 12, 2013.

* cited by examiner

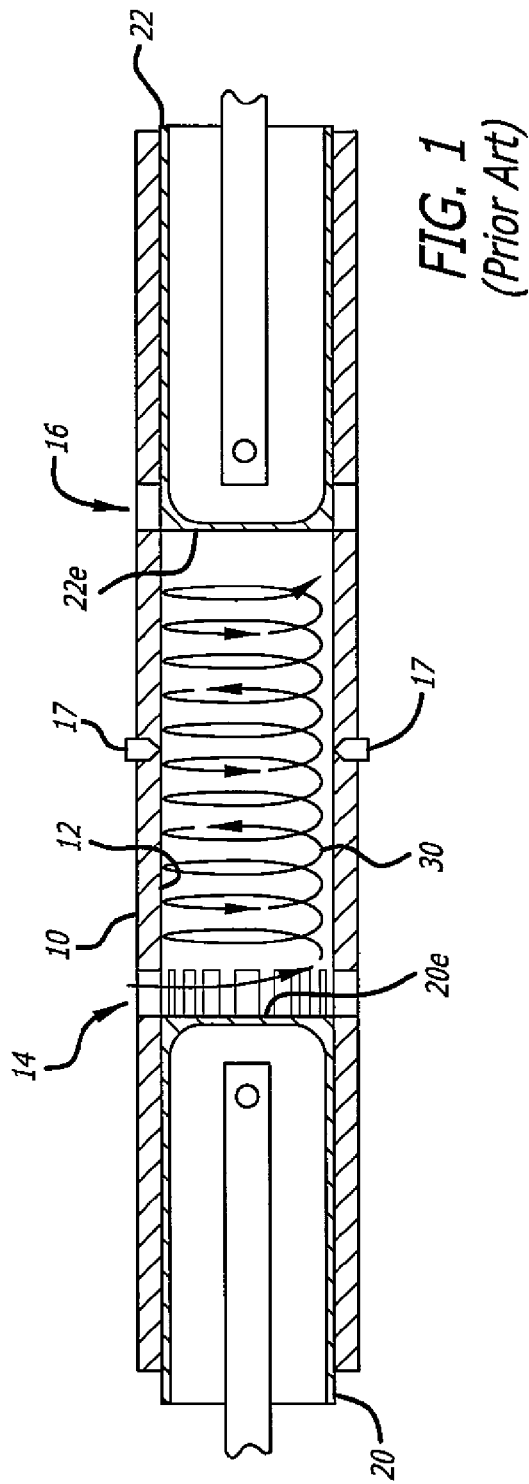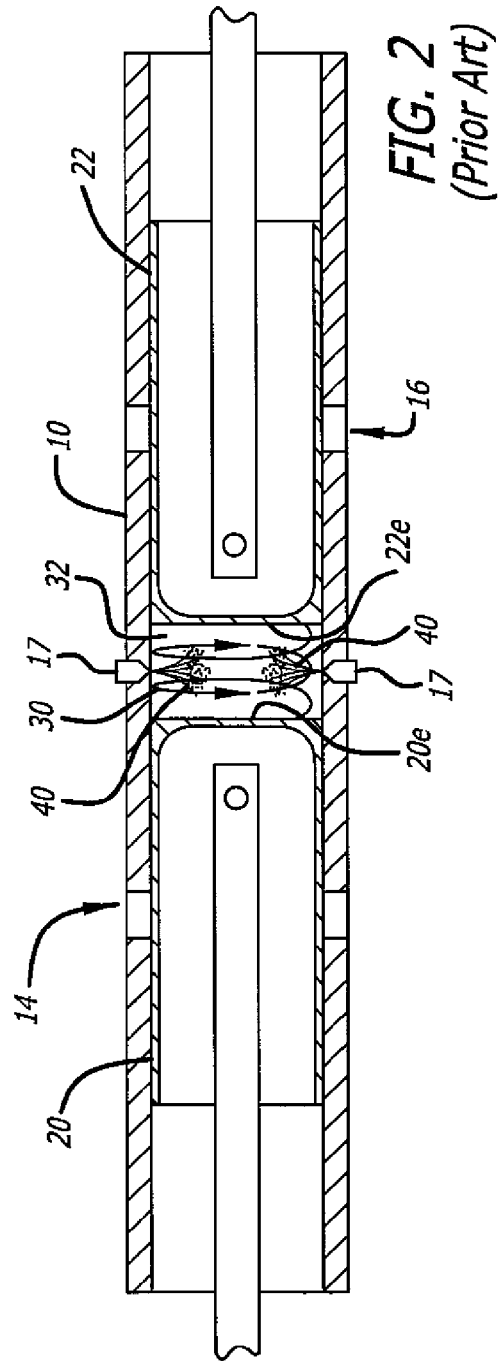

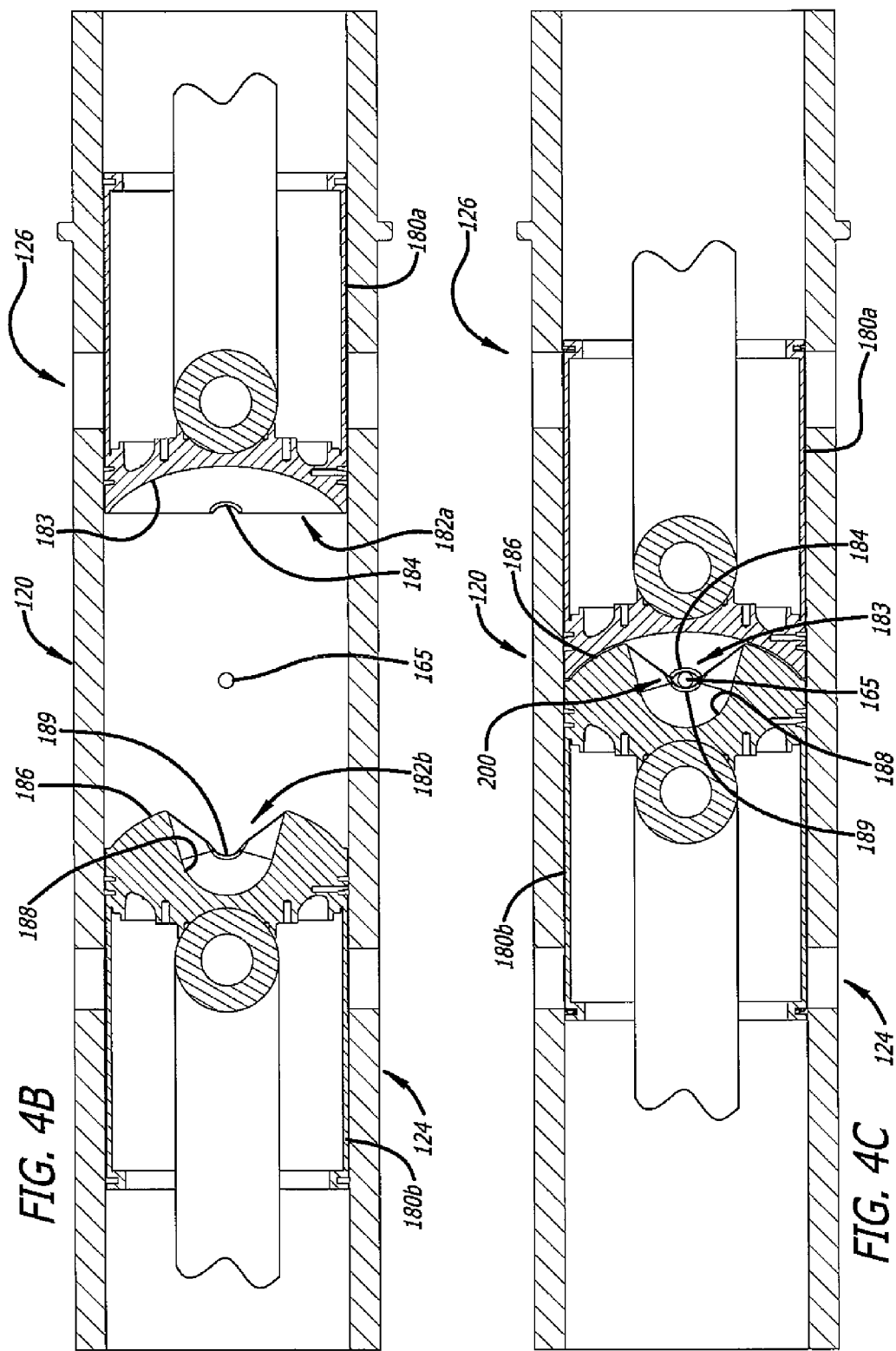

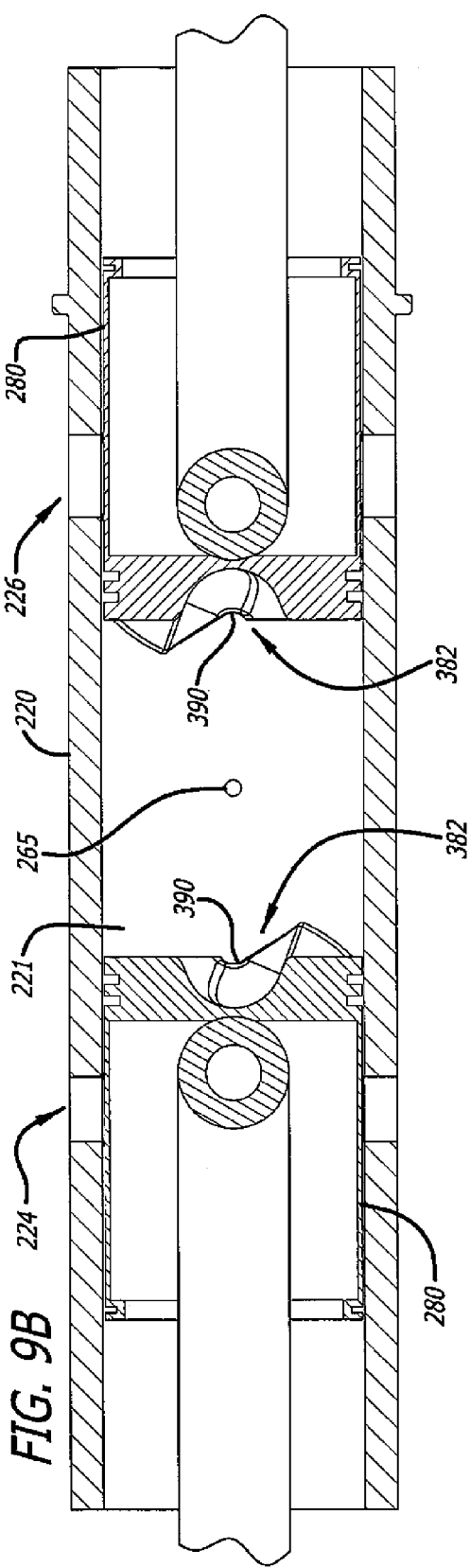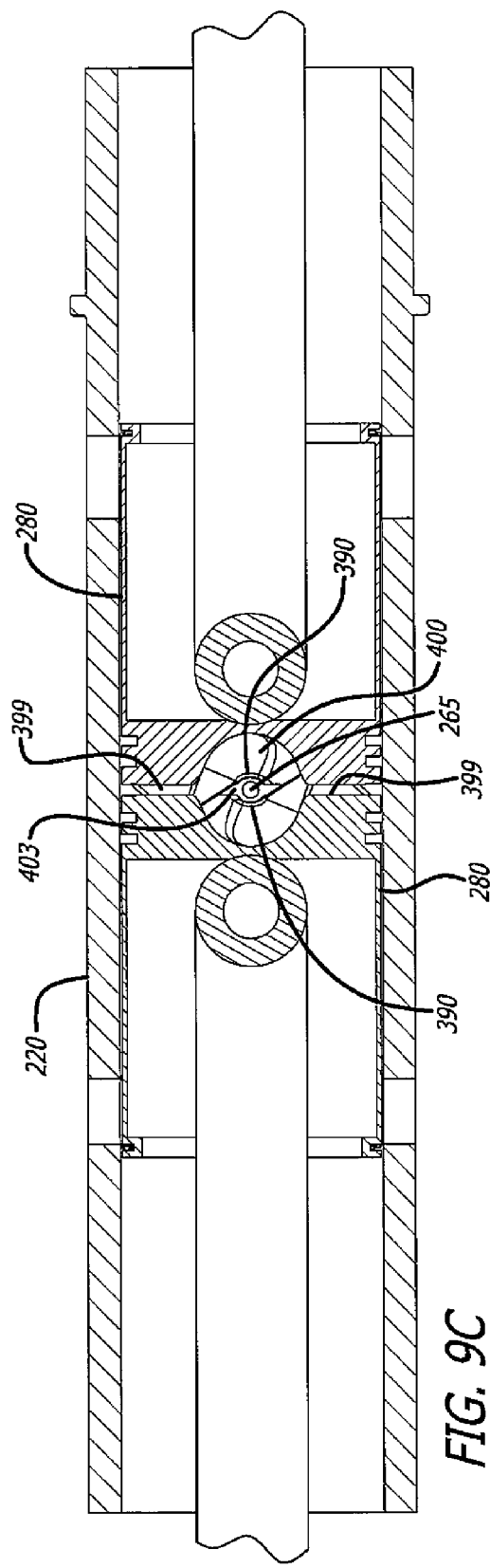

FIG. 12A
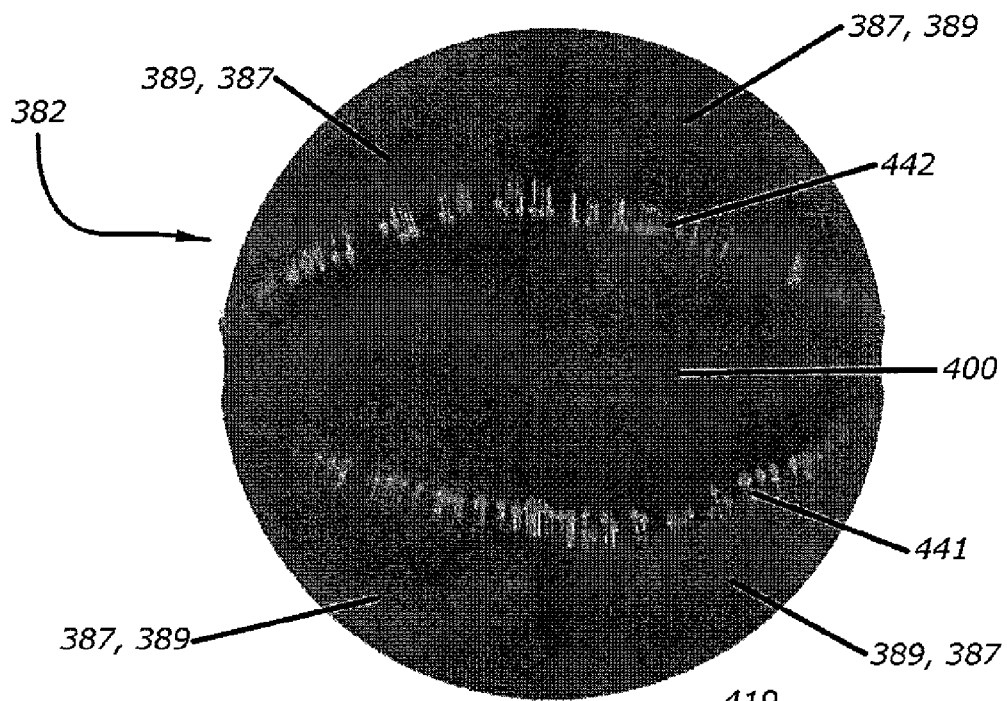
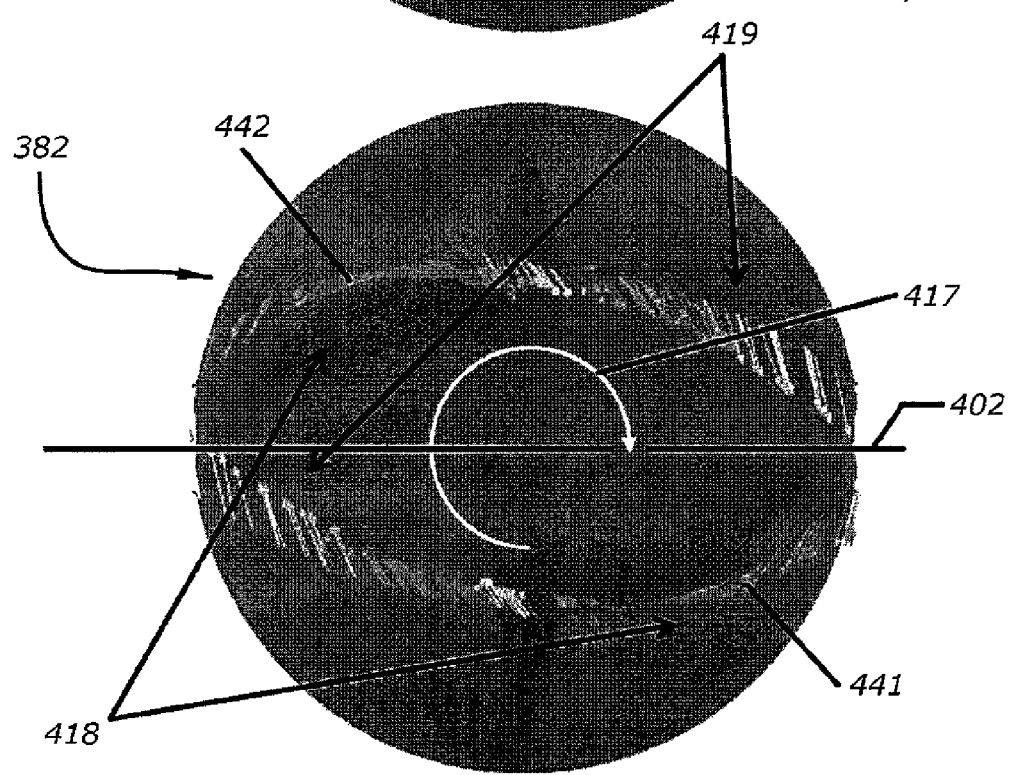
FIG. 12B

COMBUSTION CHAMBER CONSTRUCTIONS FOR OPPOSED-PISTON ENGINES

BACKGROUND

The field is combustion chambers for internal combustion engines. In particular, the field includes constructions for opposed-piston engines in which a combustion chamber is defined between end surfaces of pistons disposed in opposition in the bore of a ported cylinder. More particularly, the field includes opposed-piston engines with combustion chamber constructions that produce a tumbling motion in charge air admitted into the cylinder between the piston end surfaces.

Per FIG. 1, an opposed-piston engine includes at least one cylinder 10 with a bore 12 and longitudinally-displaced intake and exhaust ports 14 and 16 machined or formed therein. One or more fuel injectors 17 are secured in injector ports (ports where injectors are positioned) that open through the side surface of the cylinder. Two pistons 20, 22 according to the prior art are disposed in the bore 12 with their end surfaces 20e, 22e in opposition to each other. For convenience, the piston 20 is denominated as the "intake" piston because of its proximity to the intake port 14. Similarly, the piston 22 is denominated as the "exhaust" piston because of its proximity to the exhaust port 16.

Operation of an opposed-piston engine with one or more ported cylinders (cylinders with one or more of intake and exhaust ports formed therein) such as the cylinder 10 is well understood. In this regard, in response to combustion the opposed pistons move away from respective top dead center (TDC) positions where they are at their innermost positions in the cylinder 10. While moving from TDC, the pistons keep their associated ports closed until they approach respective bottom dead center (BDC) positions where they are at their outermost positions in the cylinder. The pistons may move in phase so that the intake and exhaust ports 14, 16 open and close in unison. Alternatively, one piston may lead the other in phase, in which case the intake and exhaust ports have different opening and closing times.

In many opposed piston constructions, a phase offset is introduced into the piston movements. For example, presume the exhaust piston leads the intake piston and the phase offset causes the pistons to move around their BDC positions in a sequence in which the exhaust port 16 opens as the exhaust piston 22 moves through BDC while the intake port 14 is still closed so that combustion gasses start to flow out of the exhaust port 16. As the pistons continue moving away from each other, the intake piston 20 moves through BDC causing the intake port 14 to open while the exhaust port 16 is still open. A charge of pressurized air is forced into the cylinder 10 through the open intake port 14, driving exhaust gasses out of the cylinder through the exhaust port 16. As seen in FIG. 1, after further movement of the pistons, the exhaust port 16 closes before the intake port 14 while the intake piston 20 continues to move away from BDC. Typically, the charge of fresh air is swirled as it passes through ramped openings of the intake port 14. With reference to FIG. 1, the swirling motion (or simply, "swirl") is a generally helical movement of charge air that circulates around the cylinder's longitudinal axis and moves longitudinally through the bore of the cylinder 10. Per FIG. 2, as the pistons 20, 22 continue moving toward TDC, the intake port 14 is closed and the swirling charge air remaining in the cylinder is compressed between the end surfaces 20e and 22e. As the pistons near their respective TDC locations in the cylinder bore, fuel 40 is injected into the compressed charge air 30, between the end surfaces 20e, 22e of the pistons. As injection continues, the swirling mixture of air and fuel is increasingly compressed in a combustion chamber 32 defined between the end surfaces 20e and 22e as the pistons 20 and 22 move through their respective TDC locations. When the mixture reaches an ignition temperature, the fuel ignites in the combustion chamber, driving the pistons apart toward their respective BDC locations.

The geometries of the intake port openings and the cylinder of an opposed-piston engine provide a very effective platform for generation of a strong bulk fluid motion of the charge air in the form of swirl that promotes both removal of exhaust gasses (scavenging) and the movement of fuel to air (air/fuel mixing). However, charge air motion that is dominated by swirl can produce undesirable effects during combustion. For example, during combustion in a cylindrical combustion chamber defined between flat piston end surfaces, swirl pushes the flame toward the cylinder bore, causing heat loss to the (relatively) cooler cylinder wall. The higher velocity vectors of swirl occur near the cylinder wall, which provides the worst scenario for heat losses: high temperature gas with velocity that transfers heat to the cylinder wall and lowers the thermal efficiency of the engine. The peripheries of the piston end surfaces also receive a relatively high heat load, which causes formation of a solid residue of oil coke that remains in the piston/cylinder interface when lubricating oil breaks down at high engine temperatures. Accordingly, in such opposed-piston engines, it is desirable to maintain the swirl of charge air as injection starts while mitigating its undesirable effects as combustion begins.

As fuel injection begins, it is desirable to generate turbulence in the charge air motion in order to encourage a more homogeneous mixture of fuel and air, which in turn, produces more complete and more uniform ignition than would otherwise occur.

In certain opposed-piston combustion chamber constructions, charge air turbulence is produced by squish flow from the periphery of the combustion chamber in a radial direction of the cylinder toward the cylinder's axis. Squish flow is generated by movement of compressed air from a relatively high-pressure region at the peripheries of the piston end surfaces to a lower-pressure region generated by a bowl formed in at least one piston end surface. Squish flow promotes charge air turbulence in the combustion chamber. For example, U.S. Pat. No. 6,170,443 discloses a cylinder with a pair of opposed pistons having complementary end surface constructions. A circular concave depression formed in one end surface is symmetrical with respect to the axis of its piston and rises to a point in its center. The periphery of the opposing end surface has a convex shape in the center of which a semi-toroidal (half donut-shaped) trench is formed. As the pistons approach TDC, they define a generally toroidally-shaped combustion chamber centered on the longitudinal axis of the cylinder. The combustion chamber is surrounded by a circumferential squish band defined between the concave and convex surface shapes. As the pistons approach TDC, the squish band generates an inwardly-directed squish flow into the toroidal trench and creates "a swirl of high intensity near top dead center." See the '443 patent at column 19, lines 25-27. Fuel is injected into the toroidal combustion chamber in a radial direction of the bore.

It is desirable to increase the turbulence of charge air in the combustion chamber so as to produce a more uniform mixture of air and fuel. Domination of charge air motion by swirl or squish flow alone does achieve a certain level of turbulence. Nevertheless, it is desirable to create additional elements of charge air motion as injection commences in order to produce even more turbulence of the charge air, thereby to achieve better air/fuel mixing than can be obtained with swirl or squish alone.

SUMMARY

An aspect of an invention completed in respect of the objective described above is to have the piston end surfaces define a combustion chamber that creates a charge air motion component in addition to swirl and squish. Preferably, the additional charge air component includes a tumble motion.

Another aspect of an invention completed in respect of the objective described above is to have the piston end surfaces define a combustion chamber that interacts with squish and swirl to produce one or more tumble components in charge air motion in the combustion chamber. Preferably, tumble is a motion of charge air that circulates around a diameter of the cylinder bore.

In a preferred construction, tumble is produced in an opposed-piston engine by a combustion chamber having an elongated shape with a bidirectional taper that is defined between the opposing end surfaces of the pistons when the pistons are near TDC.

In a first preferred construction, a pair of opposing pistons has complementary opposing end surfaces. A bowl formed in one end surface has a generally concave portion that receives a generally convex portion of the opposing end surface. An elongated cleft formed in the convex portion extends in a diametrical direction of the end surface, is symmetrically curved in cross-section, and has a generally elliptical shape in plan that tapers bi-directionally from a wide center to narrower ends defines an elongated, tapered combustion chamber with the concave portion of the bowl when the pistons are near TDC.

In a second preferred construction, a pair of opposing pistons has complementary opposing end surfaces. The piston end surfaces are substantially identical in structure, each including four quadrants separated into first and second regions disposed on respective sides of a major axis of an elongated elliptical shape, each region having a first quadrant curving inwardly from an end surface periphery toward the interior of the piston and a second quadrant protruding outwardly from the end surface periphery, and the regions being arranged such that first and second quadrants of the first portion face the second and first quadrants of the second region. The piston end faces are rotationally oriented in the bore of a cylinder so as to align the end surfaces in complement and define a generally elliptically-shaped combustion chamber when the pistons are near TDC.

BRIEF DESCRIPTION OF THE DRAWINGS

FIG. 1 is a side sectional partially schematic drawing of a cylinder of an opposed-piston engine with prior art opposed pistons near respective bottom dead center locations, and is appropriately labeled "Prior Art".

FIG. 2 is a side sectional partially schematic drawing of the cylinder of FIG. 1 with the prior art opposed pistons near respective top dead center locations where flat end surfaces of the pistons define a combustion chamber, and is appropriately labeled "Prior Art".

FIGS. 4A, 4B, and 4C are side sectional drawings showing an operational sequence of an opposed-piston engine including a pair of pistons according to FIGS. 3A-3D.

FIGS. 9A, 9B, and 9C are side sectional drawings showing an operational sequence of an opposed-piston engine including a pair of pistons with end surfaces according to FIGS. 8A and 8B.

FIGS. 12A and 12B are schematic illustrations of the piston end surface view of FIG. 11 showing interaction between the end surface and squish flow, without swirl (FIG. 12A), and with swirl (FIG. 12B).

DETAILED DESCRIPTION OF THE PREFERRED CONSTRUCTIONS

Figure 3A:
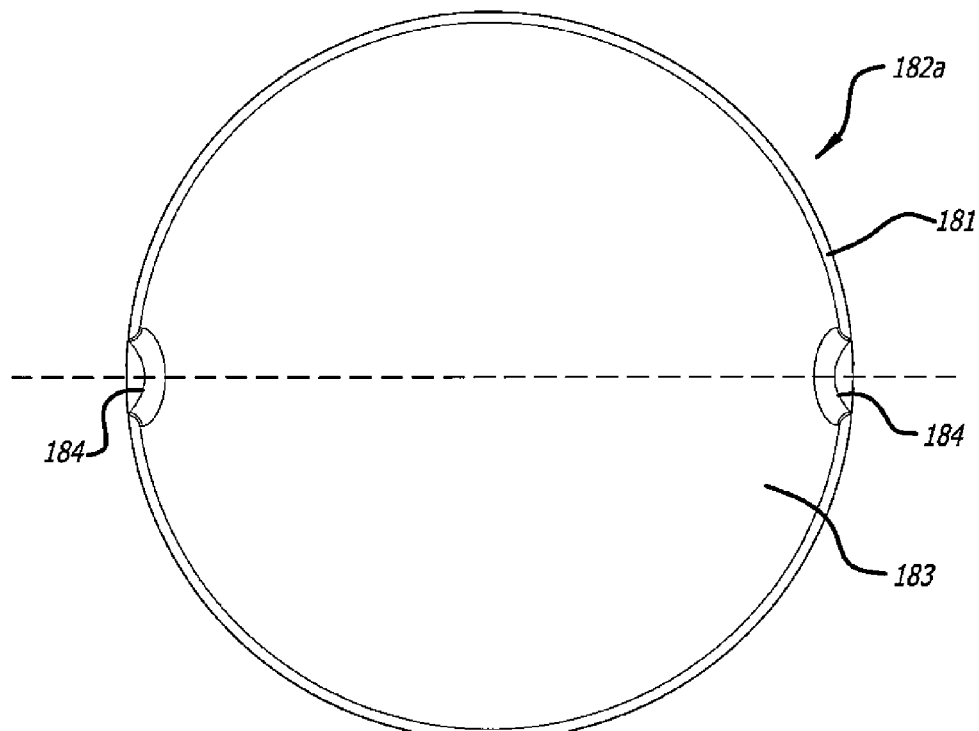
FIGS. 3A and 3B are, respectively, end and perspective views of a first piston end surface of a pair of complementary piston end surfaces that together define a first combustion chamber construction.
Figure 3B:
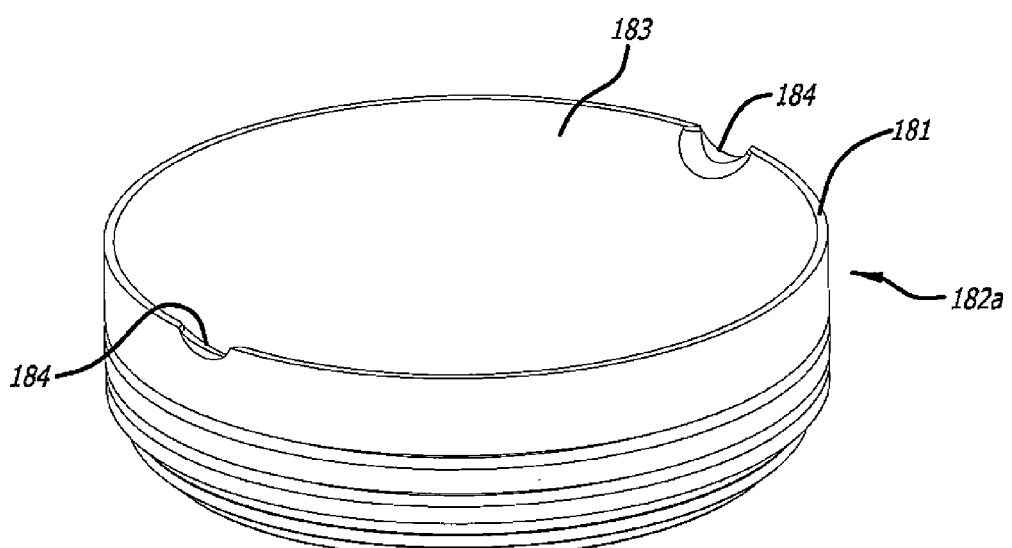
Figure 3C:
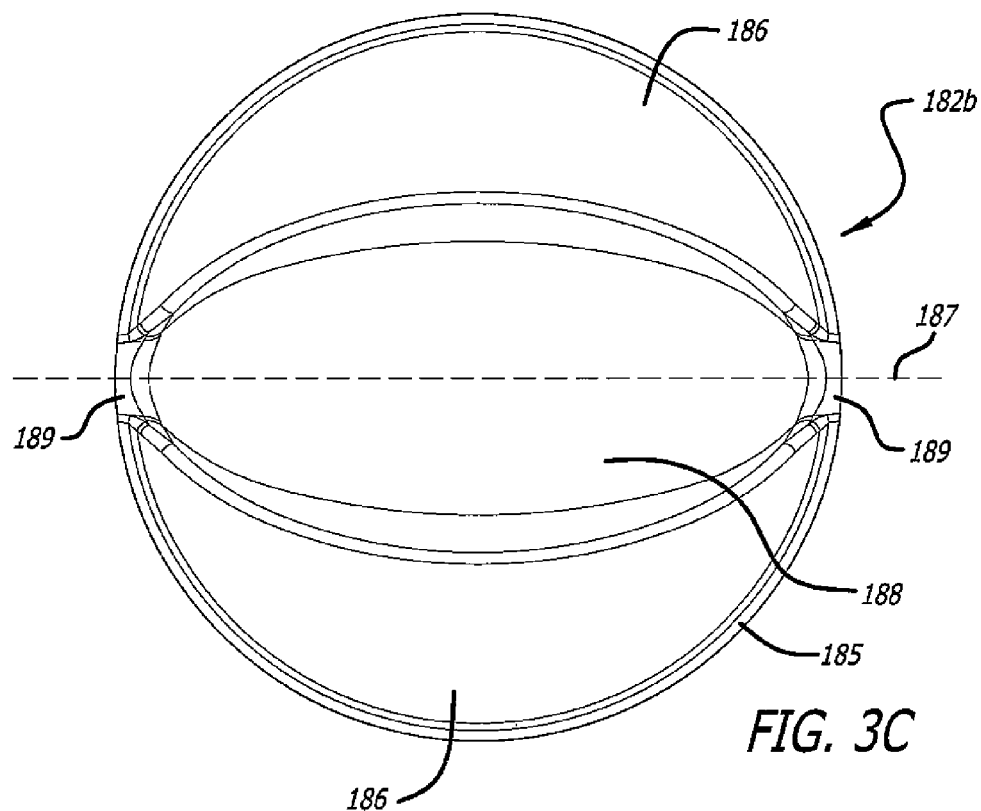
FIGS. 3C and 3D are, respectively, end and perspective views of the second piston end surface of the pair of complementary piston end surfaces that together define the first combustion chamber construction.
Figure 3D:
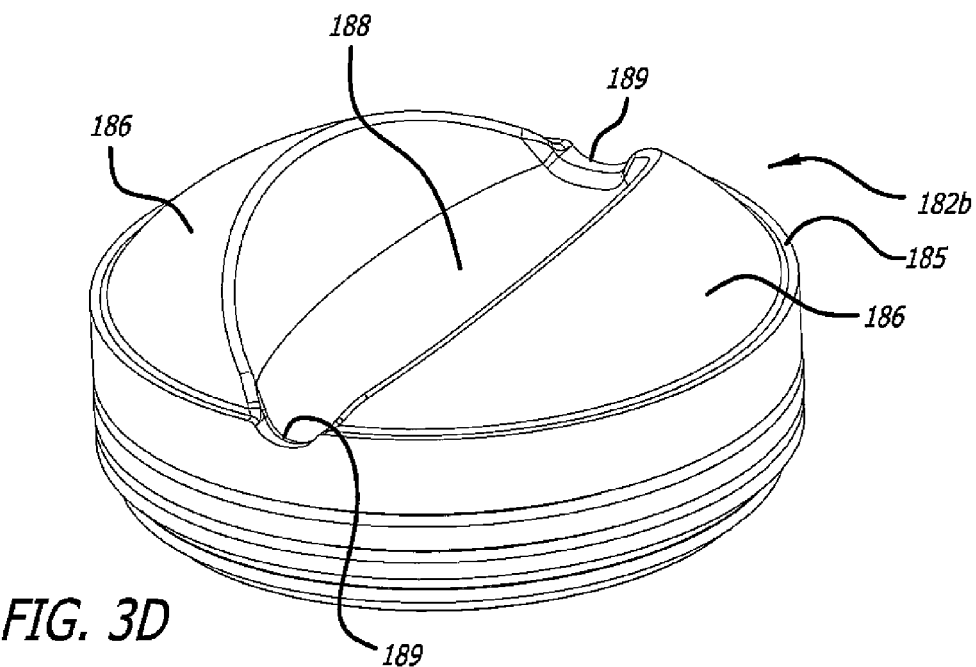

In the constructions to be described, an internal combustion engine includes at least one cylinder with longitudinally-separated exhaust and intake ports formed or machined in the sidewall of the cylinder. A pair of pistons is disposed in opposition in the bore of the cylinder, and a combustion chamber is defined between the opposing end surfaces of the pistons as the pistons move toward respective TDC positions. A circumferential area defines a periphery on each of the end surfaces. The combustion chamber structure includes a cavity or space in the bore (defined by the opposing end surfaces of the pistons) having an elongated trench-like shape with an elliptical aspect, at least in plan. The elongated combustion chamber shape extends in a diametrical direction of the cylinder and has a "major" axis in an elongated direction and a "minor" axis in a central section of the space, in which the major axis has a length greater than the length of the minor axis. The combustion chamber has at least one opening through which fuel is injected (hereinafter an "injection port") that is aligned with the major axis and opens into the cavity. Preferably, the combustion chamber has two injection ports that are aligned with the major axis and open into the cavity.

During operation of the internal combustion engine, as the pistons approach TDC, one or more squish zones direct flows of compressed air (called "squish flows") into the combustion chamber in at least one direction that is skewed with respect to a diametrical direction of the bore. This process is referred to as "generating squish". The portions of the end surfaces that generate squish are referred to as squish surfaces, and channels defined between the squish surfaces are referred to as squish channels. Squish flow is deflected or redirected by one or more curved surfaces in a combustion chamber cavity into at least one tumble motion that circulates in the cavity.

Each of the constructions to be described produces a different bulk fluid motion in the combustion chamber at the start of injection due to the interaction of the swirling flow of charge air in the cylinder at the end of scavenging with the piston end surfaces as the pistons move towards TDC. The overall magnitude of the charge air angular momentum is reduced by the interaction with the piston end surfaces during compression, but the shapes of the end surfaces provide a mechanism to apply torques about tumble axes and also confine the charge air/fuel mixture into the centrally located combustion chamber, which simultaneously modifies the initial swirl and produces tumbling motions as the pistons approach TDC.

In the following descriptions, "fuel" is any fuel that can be used in an opposed-piston engine. The fuel may be a relatively homogeneous composition, or a blend. For example, the fuel may be diesel fuel or any other fuel ignitable by compression ignition. Further, the descriptions contemplate ignition resulting from compression of an air/fuel mixture; however it may be desirable to provide additional mechanisms, such as glow plugs, to assist compression ignition. The descriptions contemplate injection of fuel into a compressed gas in a combustion chamber when opposed pistons are at or near TDC locations. The gas is preferably pressurized ambient air; however, it may include other components such as exhaust gases or other diluents. In any such case, the gas is referred to as "charge air."

First Combustion Chamber Construction:

FIGS. 3A-3D illustrate piston crowns with complementary piston end surface structures for defining a first combustion chamber construction in a ported cylinder of an opposed piston engine. One piston crown has an end surface structure including a periphery surrounding a bowl defining a concave surface curving away from the periphery toward the interior of a piston to which the crown is mounted or formed. The other piston crown has an end surface structure including a periphery surrounding a convex portion protruding outwardly from the interior of a piston to which the crown is mounted or formed and an elongated cleft extending in a diametrical direction of the piston. The concave surface receives the convex surface and meets the elongated cleft to define a combustion chamber therewith. Preferably, the combustion chamber space defined between these two end surfaces has an aspect that is, or is very close to, an elongated ellipsoid, providing a generally symmetrical geometry to reinforce and sustain the tumble motion.

The first combustion chamber construction is defined between opposing piston end surfaces having the complementary shapes shown in FIGS. 3A-3D. As per FIGS. 3A and 3B, a piston crown includes a first piston end surface 182a having a generally circular configuration in plan that includes a flat circumferential area defining a periphery 181 of the first end surface. The periphery 181 surrounds a bowl constituted of a generally concave portion 183. Diametrically opposed notches 184 are formed in the periphery 181 and the outer part of the bowl. As per FIGS. 3C and 3D, a piston crown includes a second piston end surface 182b having a generally circular configuration in plan that includes a flat circumferential area defining a periphery 185 of the second end surface. The periphery 185 surrounds a generally convex portion 186 in which an elongated cleft 188 is formed. As per FIG. 3C, the elongated cleft has an elliptical aspect when viewed in plan. The elongated cleft 188 has a major axis 187 that is collinear with a diameter of the second end surface 182b. The elongated cleft 188 is symmetrical about the major axis 187. Diametrically opposed notches 189 formed in the periphery 185 are aligned along the major axis 187 and open into the cleft portion 188.

Figure 4A:
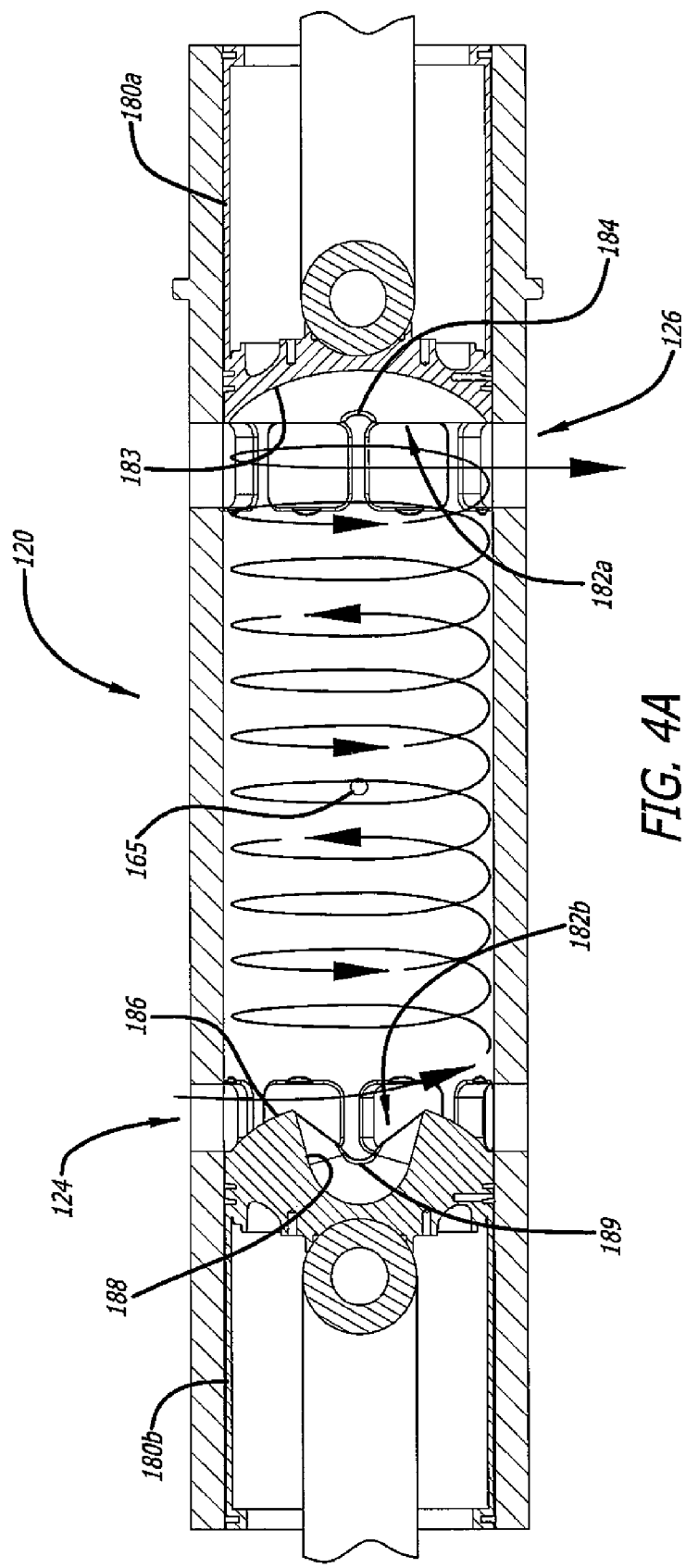
Figure 5A:
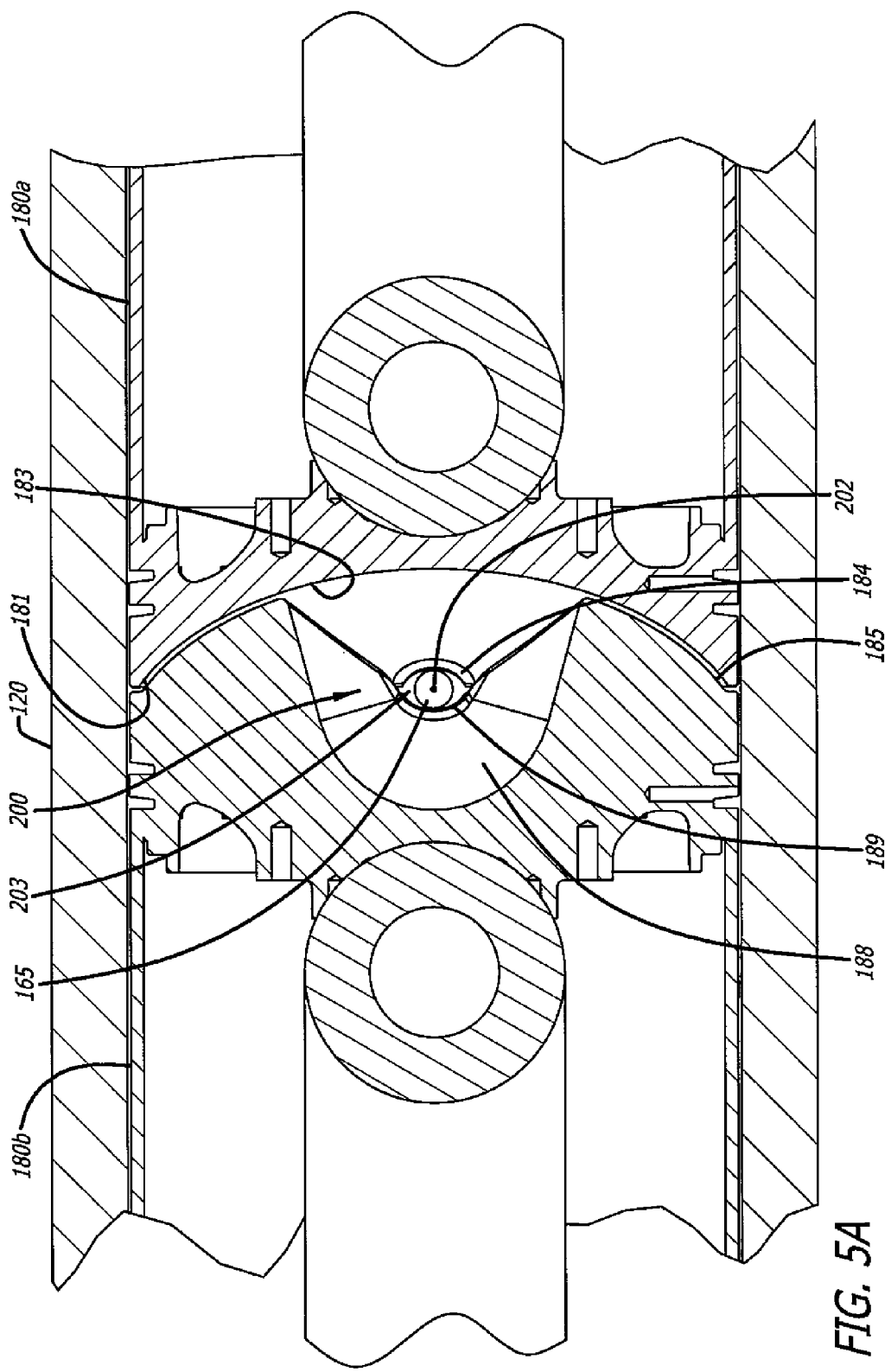
FIG. 5A is an enlarged view of a portion of FIG. 4C showing the first combustion chamber construction in greater detail.

Referring now to FIG. 4A, two pistons 180a and 180b including crowns with the first and second end surfaces 182a and 182b are shown near respective BDC locations within a ported cylinder 120. The pistons are rotationally oriented in the bore of the cylinder 120 so as to align the end surfaces 182a and 182b in complement; that is to say, the notches 184 of the end surface 182a are aligned with the notches 189 of the end surface 182b, and each notch pair 184, 189 is positioned in alignment with an injector port 165 that opens through the sidewall of the cylinder 120. Charge air enters the cylinder 120 through the intake port 124 as exhaust products flow out of the cylinder through the exhaust port 126. For purposes of scavenging and air/fuel mixing, the charge air is caused to swirl as it passes through the intake port 124. As the pistons 180a and 180b move from BDC toward TDC as per FIG. 4B, the intake and exhaust ports 124 and 126 are closed and the swirling charge air is increasingly compressed between the end surfaces 182a and 182b. With reference to FIGS. 4C and 5A, as the pistons 180a and 180b approach TDC, a combustion chamber 200 is defined between the end surfaces 182a and 182b. The combustion chamber 200 has a cavity defined between the central portion of the concave surface 183 and the elongated cleft 188. As the pistons 180a and 180b move through their respective TDC locations, the opposing concave-convex surface portions 183, 186 mesh with one another to give the space of the combustion chamber 200 an elongated, bi-directionally tapered shape.

Figure 6:
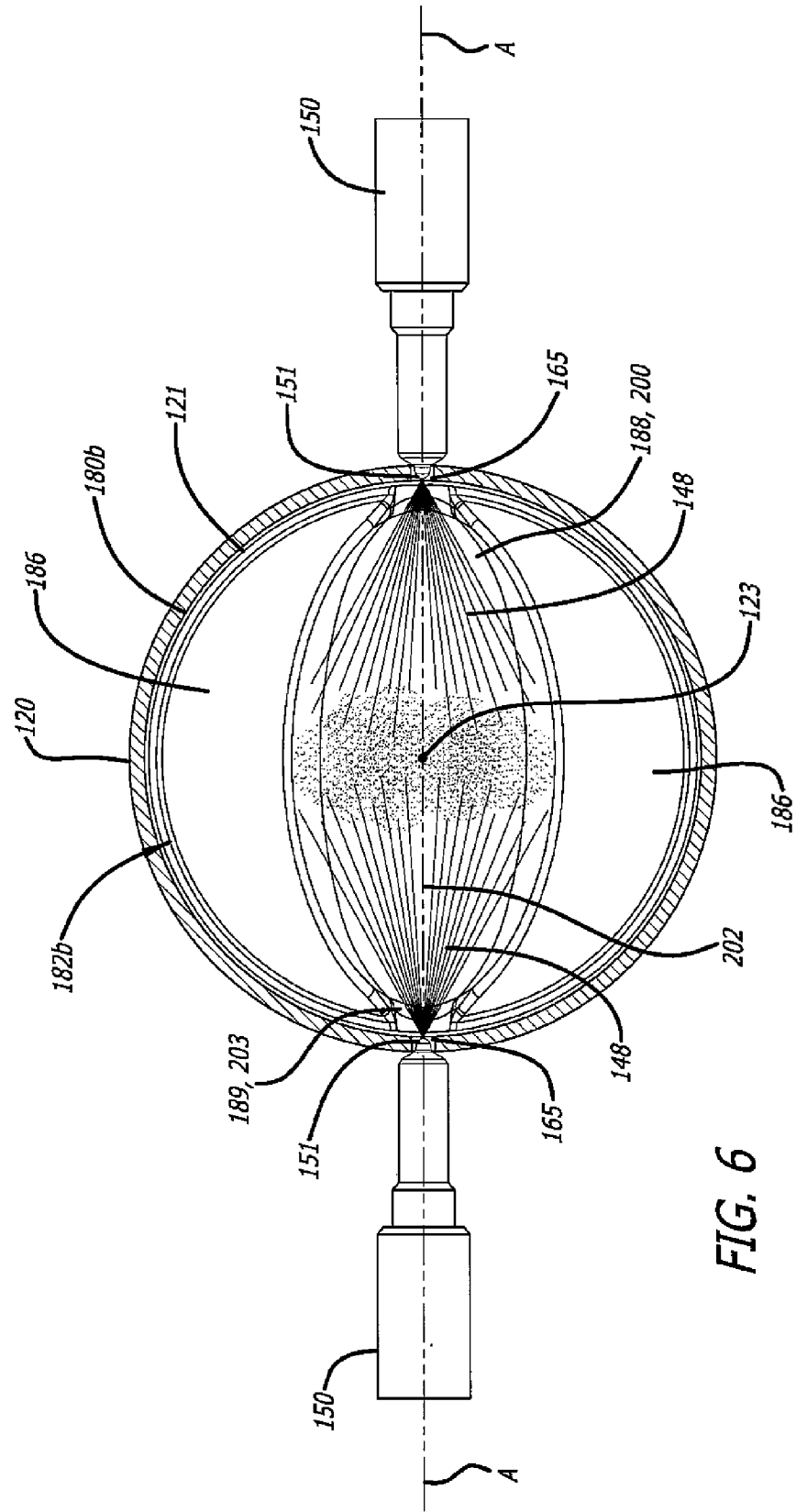
FIG. 6 is an end view of the piston of FIGS. 3C and 3D showing a convex end surface with an elongated cleft formed therein and a pattern of fuel injection in an elongated tapered combustion chamber.

As per FIGS. 5A and 6, the cavity of the combustion chamber is constituted of a concave dome-like cover 183 over an elongate trench 188, which is symmetrically curved in cross-section, and which has an elliptical shape in plan that tapers symmetrically and bi-directionally from a wide center to narrower ends. The combustion chamber extends between diametrically-opposed peripheral locations on a major axis 202 which is collinear with a diameter of the cylinder 120. At each narrower end of the combustion chamber 200, opposing pairs of notches 184, 189 in the peripheries 181 and 185 define injection ports 203 into the chamber 200.

Figure 5B:
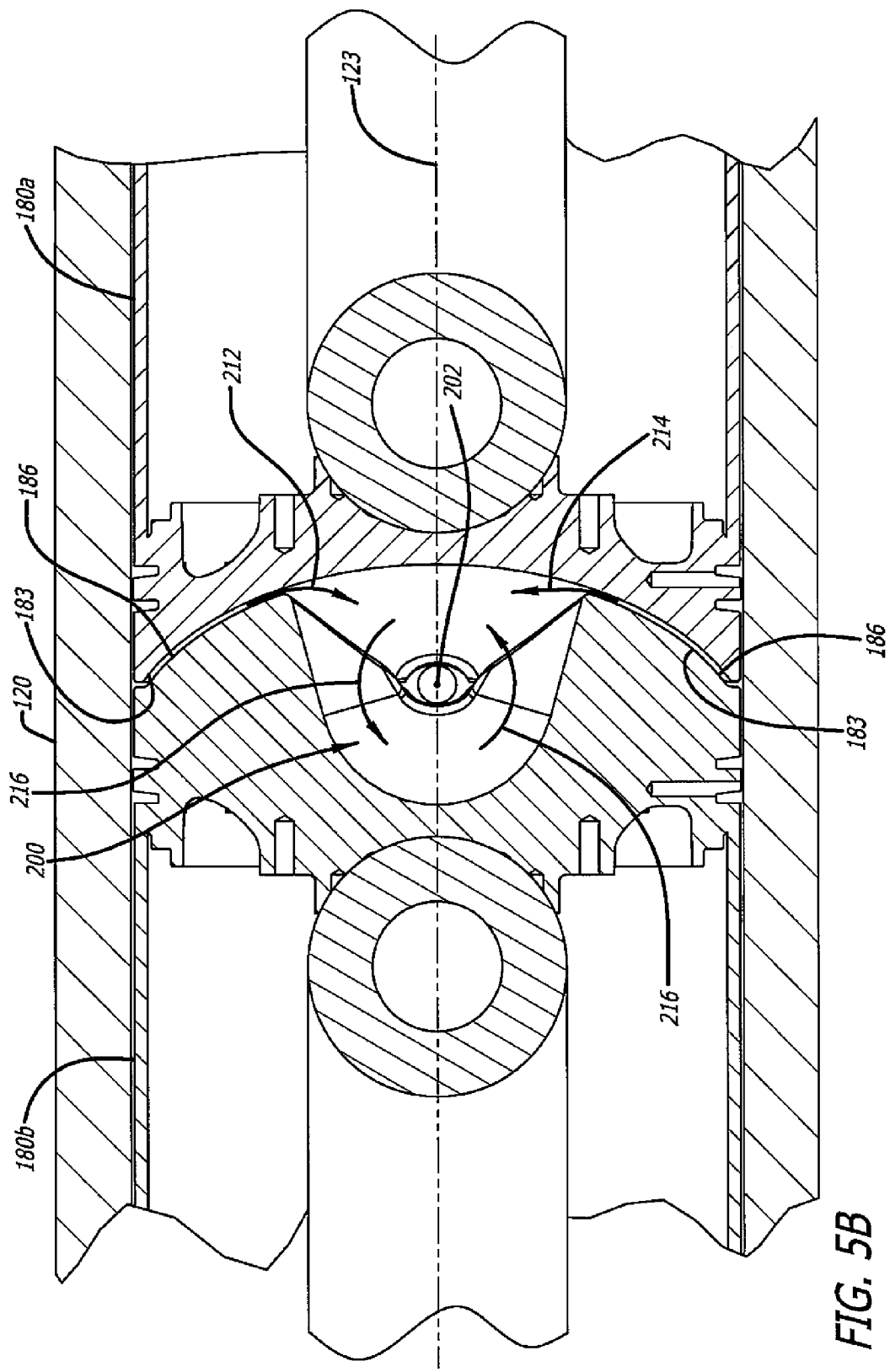
FIG. 5B is the same view as FIG. 5A showing squish and tumble air flows in the combustion chamber.

As seen in FIG. 5B, as the pistons 180a, 180b approach TDC positions, compressed charge air flows from the peripheries of the end surfaces, through opposing curved squish regions defined between concave-convex surface portions 183, 186. At the same time, compressed air nearer the longitudinal axis 123 of the cylinder 120 continues to swirl. The interactions of swirl and squish flow produce tumble at each end of the combustion chamber 200. The tumble is indicated by reference numeral 216. Each tumble component has a motion that circulates around the major axis 202. That is to say, the tumble circulates around the diameter of the cylinder 120, which is collinear with the major axis.

Figure 7A:
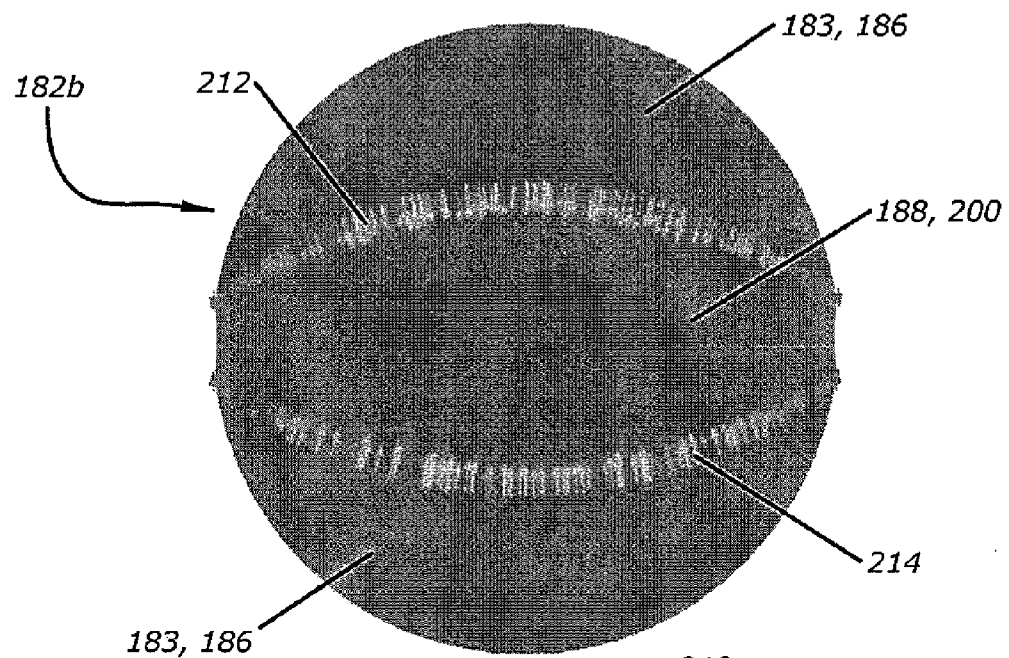
FIGS. 7A and 7B are schematic illustrations of the piston end surface view of FIG. 6 showing interaction between the end surface and squish flow, without swirl (FIG. 7A), and with swirl (FIG. 7B).
Figure 7B:
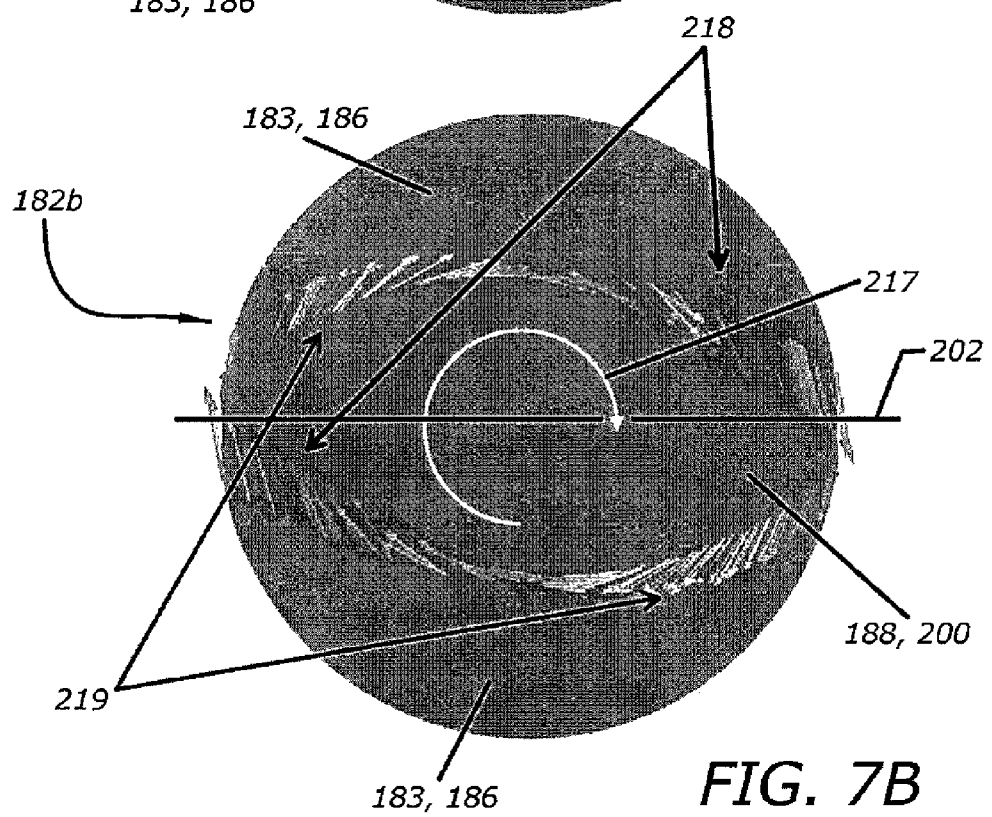

Interactions between the end surfaces and charge air are illustrated in FIGS. 7A and 7B. FIG. 7A shows squish flows 212, 214 into the combustion chamber 200 without charge air swirl; FIG. 7B illustrates how the squish flows 212 and 214 affect and are affected by swirl 217. As the pistons move toward TDC, squish regions (between opposing concave-convex surface portions 183, 186 as seen in FIG. 5B) produce locally high pressure as the pistons move towards TDC that directs squish flows of charge air into the central region of the combustion chamber 200. In this regard, with reference to FIGS. 5A and 7A, at the start of injection, when the pistons 180a and 180b are near their respective TDC locations, the concave-convex surface portions 183, 186 generate squish flows 212, 214 into the combustion chamber 200. As illustrated in FIG. 5B, these squish flows are mutually opposing. With reference to FIG. 7B, when swirl 217 is added to charge air motion, the swirling motion, depending on its intensity, counteracts or overcomes squish flow in the combustion chamber regions 218, and enhances the squish flow at the interface between the combustion chamber regions 219. These swirl-plus-squish interactions generate respective counter-rotating tumbling motions around the major axis 202; that is to say, if one tumble rotates CW, the other rotates CCW. Each tumbling motion is located near a respective end of the combustion chamber 200. Charge air continues to swirl in the central portion of the combustion chamber 200.

Thus, in response to swirling charge air, the first combustion chamber construction produces tumble at each end of the combustion chamber. The tumbling flows at each end of the combustion chamber are in opposite directions so the overall effect is to produce a counter-rotating tumble flow with zero net tumble for the entire central combustion chamber.

With reference to FIGS. 5A and 6, fuel 148 is injected into the charge air in the combustion chamber space 200 by opposed injectors 150. According to the first construction, the combustion chamber is essentially centered with respect to the longitudinal axes of the cylinder 120 and the pistons 180a and 180b. When the pistons 180a and 180b are near TDC, at least one pair of aligned notches 184, 189 defines at least one injection port 203 opening into the combustion chamber cavity 200. The at least one injection port 203 is located at or near one end of the combustion chamber 200, aligned with the major axis 202 thereof, so that the fuel plume 148 is confined in the combustion chamber. Preferably, two injection ports 203 are provided at each end of the combustion chamber cavity 200, aligned with the major axis 202, and fuel is injected from two opposing injectors 150 through the injection ports.

In some aspects, it is desirable to inject at least one spray of fuel into a combustion chamber having the shape an elongated tapered shape; it is preferable, however, to inject a pair of opposing sprays of fuel into the turbulent bulk air motion generated in the combustion chamber by swirl-plus-squish interactions. The opposing sprays meet in the combustion chamber and form a cloud of fuel that is well mixed with the compressed charge air due to the turbulence. With reference to FIG. 6, the view is a sectional one at or near the longitudinal midpoint of the cylinder 120, looking directly into the cylinder's bore 121 toward the piston end surface 182b disposed in the bore at a position where it and the unseen piston end surface 182a define the combustion chamber 200. According to the first construction, the combustion chamber 200 is essentially centered longitudinally with respect to the cylinder's axis 123. The fuel injectors 150 are positioned with their nozzle tips 151 disposed at injector ports 165. Each injector nozzle tip has one or more holes through which fuel 148 is injected through a respective injector port, into the combustion chamber 200. Preferably, each injector tip 151 sprays fuel 148 in a diverging pattern that is aligned with and travels through an injection port 203 along the major axis 202 of the elongated tapered combustion chamber 200, into the chamber's central portion. Preferably, opposing spray patterns of fuel are injected into the turbulent air motion in the combustion chamber 200. In some aspects, the opposing spray patterns meet at or near the center of the combustion chamber and form a cloud that is mixed with charge air having a complex turbulent motion that includes swirl and tumble components. Preferably, but not necessarily, the fuel injectors 150 are disposed such that their axes A are in alignment with each other and a diametrical direction of the bore 121. This causes the injector tips to be oriented in opposition along a diameter of the cylinder 120 that is aligned with the major axis 202.

Figure 8A:
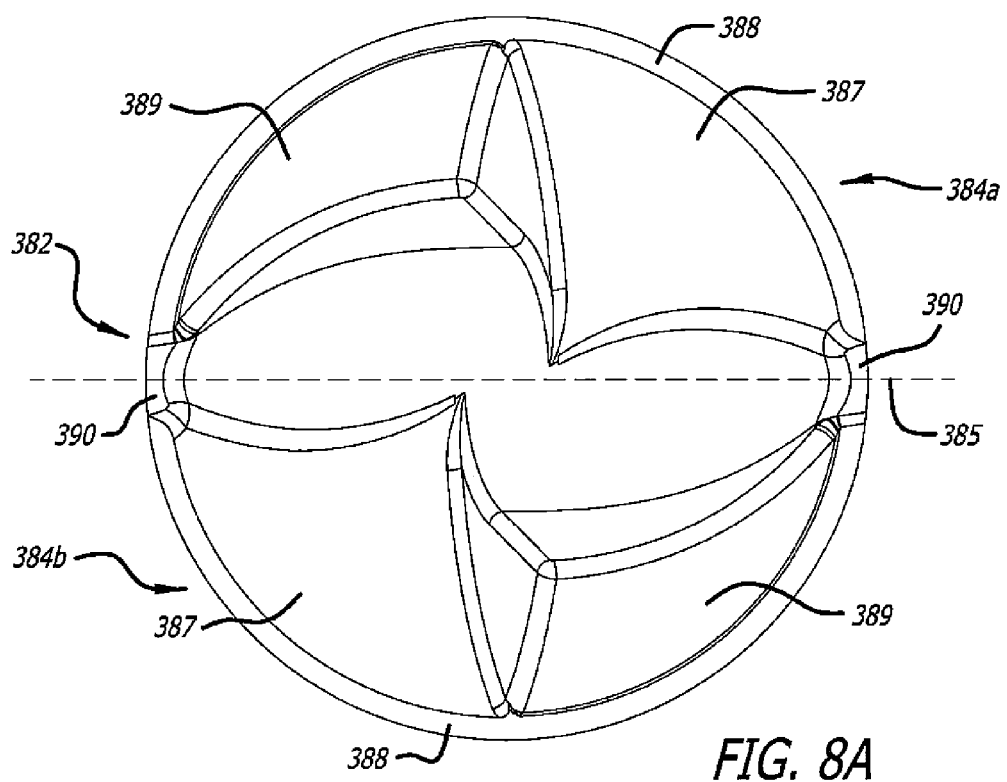
FIGS. 8A and 8B are, respectively, plan and perspective views of a second piston end surface construction which illustrate identical piston end surfaces formed to define a second combustion chamber construction.
Figure 8B:
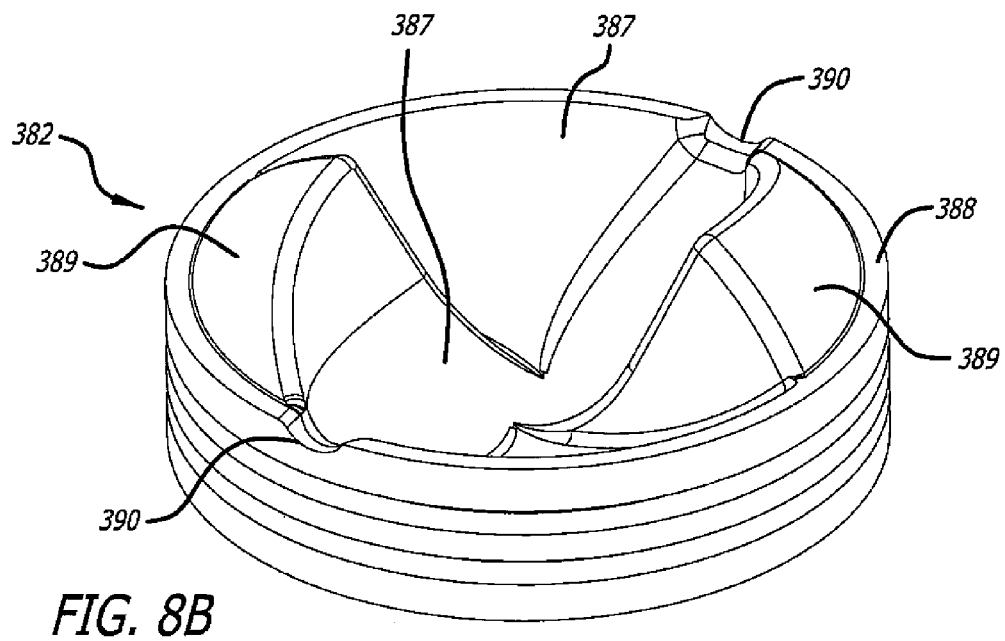

Second Combustion Chamber Construction:

FIGS. 8A and 8B illustrate a piston crown having a piston end surface for defining a second combustion chamber construction structure having the shape of an elongated ellipsoid. The combustion chamber is defined by complementary end surface structures of opposed pistons disposed in a ported cylinder of an opposed piston engine. Identical generally symmetrical structures are formed in the end surfaces of the opposed pistons, and the pistons are rotationally oriented to place complementary features of the surfaces in opposition.

A piston crown has the piston end surface structure illustrated in FIGS. 8A and 8B. The piston end surface 382 includes four quadrants separated into first and second regions 384a and 384b disposed on respective sides of a major axis 385 of the elongated ellipsoidal shape, each region having a first quadrant 387 curving inwardly from the end surface periphery 388 toward the interior of a piston on which the crown is mounted or formed and a second quadrant 389 protruding outwardly from the end surface periphery 388. The regions are arranged such that first and second quadrants of the first portion 384a face the second and first quadrants of the second region 384b. Opposed notches 390 formed in the periphery of the end surface 382 are aligned with the major axis 385.

Figure 9A:
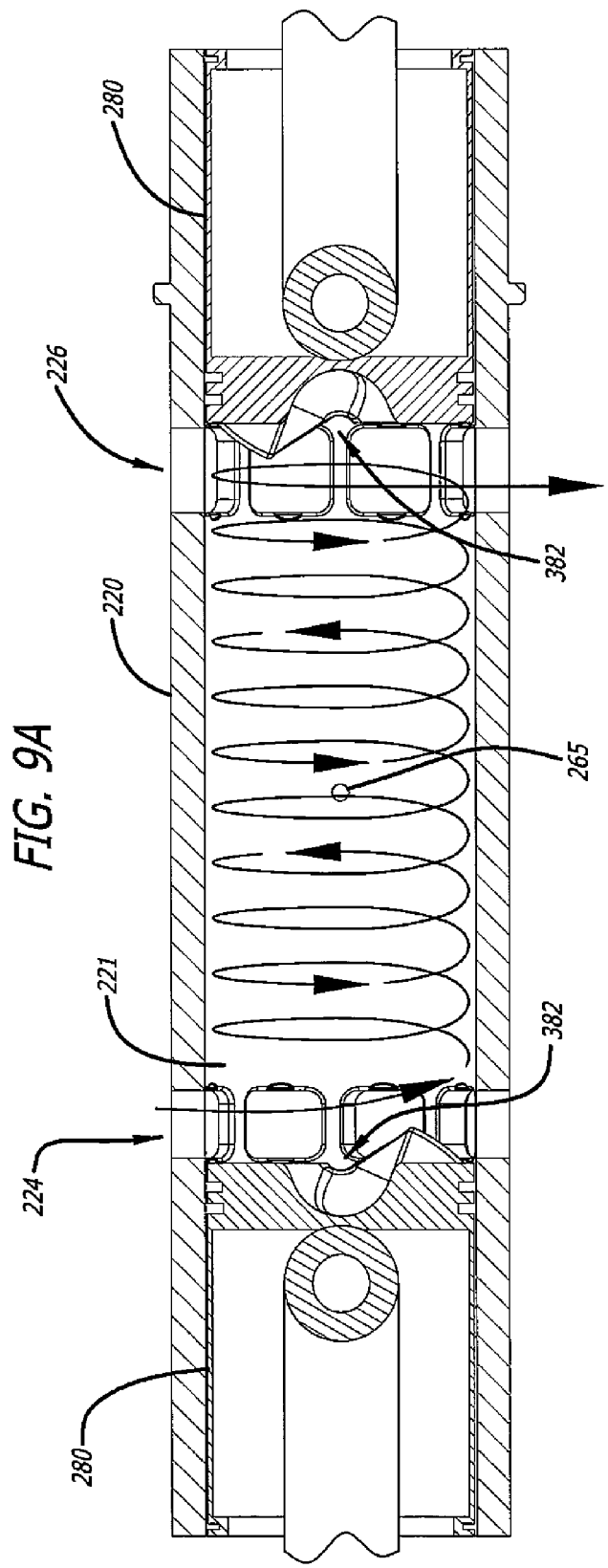

As per FIG. 9A, the pistons 280 on which the end surfaces 382 are disposed are rotationally oriented in the bore 221 of the cylinder 220 so as to align the end surfaces in complement; that is to say, the first and second quadrants of one end surface 382 face second and first quadrants of the other end surface 382. Charge air is forced through the intake port 224 into the cylinder, as exhaust products flow out of the cylinder through the exhaust port 226. For purposes of scavenging and air/fuel mixing, the charge air is caused to swirl as it passes through the intake port 224. As the pistons 280 move from BDC toward TDC as per FIG. 9B, the intake and exhaust ports 224 and 226 are closed and the swirling charge air is increasingly compressed between the end surfaces 382. With reference to FIGS. 9B and 9C, as the pistons 280 approach TDC, compressed air flows from the peripheries of the end surfaces through squish channels 399 defined between the concave-convex surface pairs 387, 389 (best seen in FIGS. 8A and 8B). These squish airflows flow into a combustion chamber 400 having a cavity defined between the end surfaces 382. At the same time, compressed charge air nearer the longitudinal axis of the cylinder continues to swirl. As the pistons 280 move through their respective TDC locations, the opposing concave-convex surfaces 387, 389 mesh with one another to give the combustion chamber cavity an elongated, generally ellipsoidal shape. Opposing pairs of notches 390 in the end surfaces 382 define injection ports 403 that open into the combustion chamber 400 at opposing pole positions of the ellipsoidal shape. As per FIG. 11, the injection ports 403 at diametrically opposing ends of the combustion chamber 400 are aligned along the major axis 402 of the combustion chamber 400.

Figure 10:
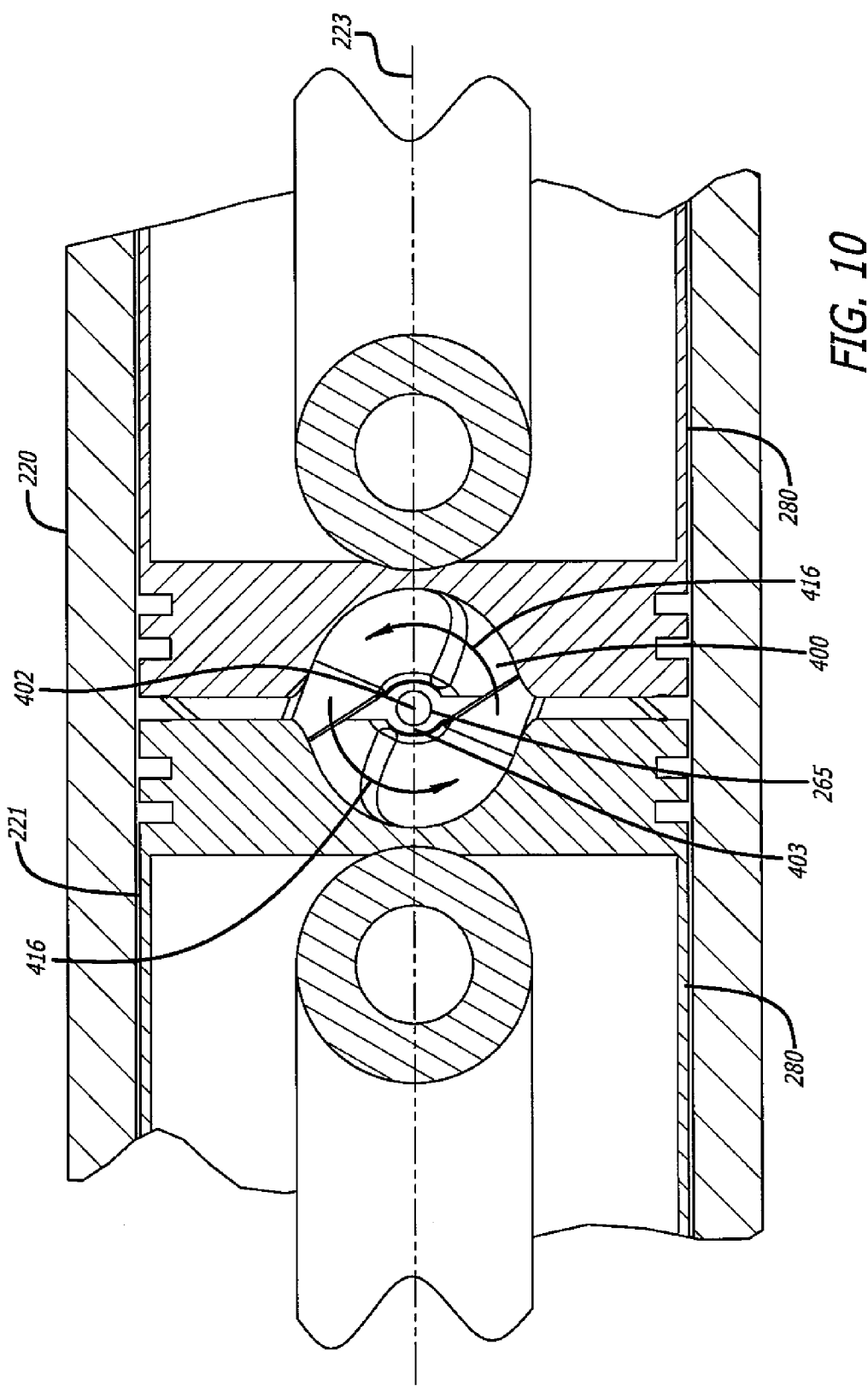
FIG. 10 is an enlarged view of a portion of FIG. 9C showing the second combustion chamber construction in greater detail including tumble air flow.

With reference to FIG. 10, as the pistons 280 approach TDC positions, compressed charge air flows from the peripheries of the end surfaces into the combustion chamber 400. At the same time, compressed air nearer the longitudinal axis 223 of the cylinder 220 continues to swirl. The interactions of swirl and squish flow produce tumble at each end of the combustion chamber 400 as indicated by reference numeral 416. Each tumble component has a motion that circulates around the major axis 402. That is to say, the tumble components circulate around the diameter of the cylinder 220, which is collinear with the major axis.

Interactions between the end surfaces 382 and charge air are illustrated in FIGS. 12A and 12B. FIG. 12A shows squish flows into the combustion chamber 400 without charge air swirl; FIG. 12B illustrates how the squish flows affect and are affected by swirl. As the pistons move toward TDC, squish regions (between opposing concave-convex surface pairs 387, 389 seen in FIGS. 8A and 8B) produce locally high pressure that directs squish flows of charge air into the central region of the combustion chamber 400. In this regard, with reference to FIGS. 10 and 12A, at the start of injection, when the pistons are near their respective TDC locations, the concave-convex surface pairs generate squish flows 441, 442 into the combustion chamber 400. These squish flows are mutually opposing. Per FIG. 12A, the squish airflows 441 and 442 curve into the cavity of the combustion chamber 400, where they tend to rotate in opposing directions. With reference to FIG. 12B, when swirl 417 is added to charge air motion, the swirling motion, depending on its intensity, counteracts or overcomes squish flow in the combustion chamber regions 418, and enhances the squish flow at the interface between the combustion chamber regions 419. These swirl-plus-squish interactions generate respective, counter-rotating tumbling motions around the major axis 402; that is to say, if one tumble rotates CW, the other rotates CCW. Each tumbling motion is located near a respective end of the combustion chamber 400. Charge air continues to swirl in the central portion of the combustion chamber 400.

Thus, in response to swirling charge air, the second combustion chamber construction produces a tumbling air flow motion at each end of the combustion chamber due to two complementary adjacent quadrant squish flows. The tumbling flows circulate in opposite directions so the overall effect is to produce a counter-rotating tumble flow with zero net tumble for the entire central combustion chamber.

Figure 11:
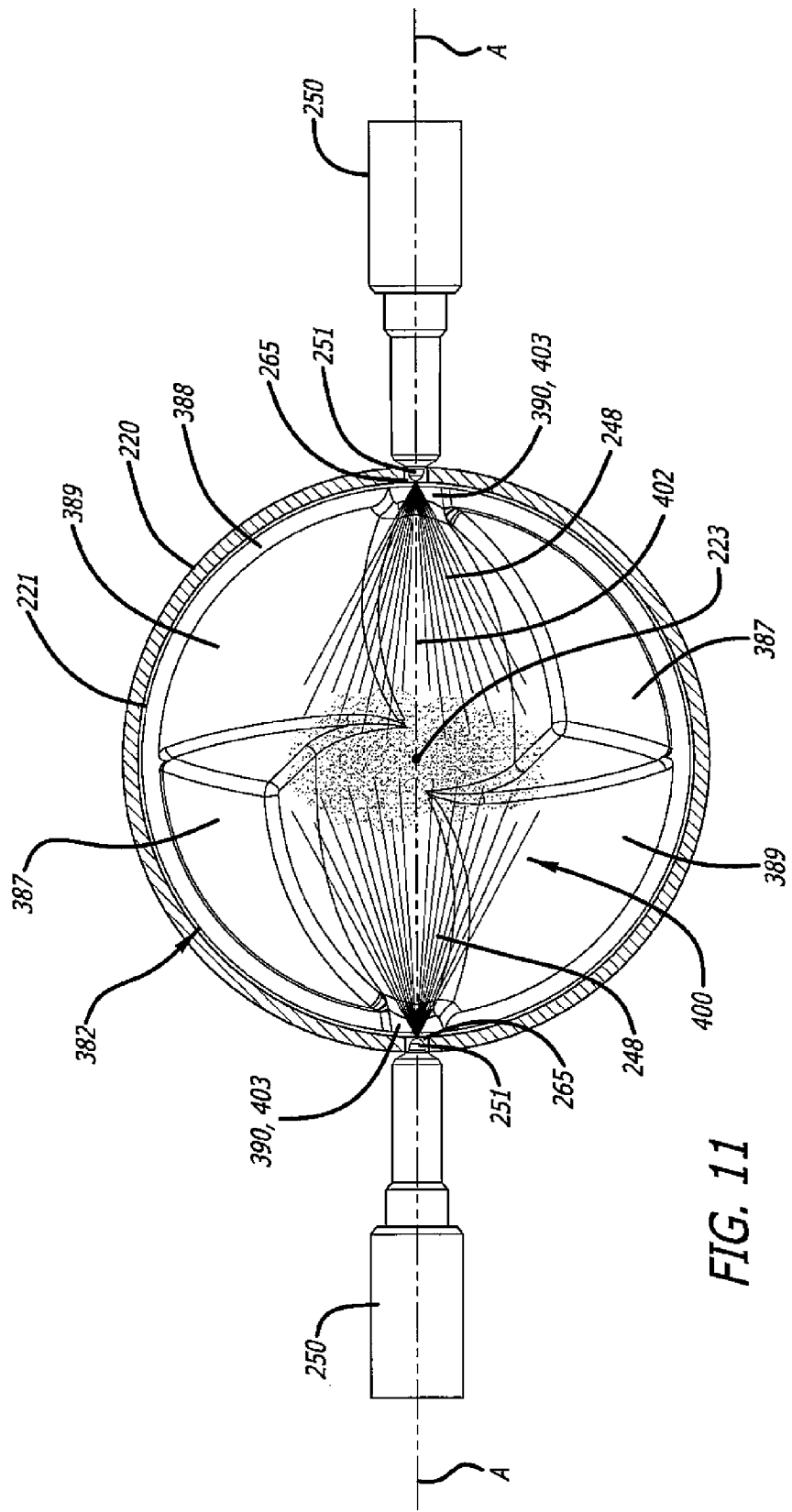
FIG. 11 is an end view of a piston having an end surface according to FIG. 8A showing first and second regions disposed on respective sides of a major axis of an elongated elliptical shape formed therewith and a pattern of fuel injection in an elliptically-shaped combustion chamber.

With reference to FIGS. 10 and 11, fuel 248 is injected into the charge air in the combustion chamber space 400 by opposed injectors 250. According to the second construction, the combustion chamber is essentially centered with respect to the longitudinal axes of the cylinder and the pistons. When the pistons are near TDC, at least one pair of aligned notches 390 defines at least one injection port 403 opening into the combustion chamber cavity 400. The at least one injection port 403 is located at or near one end of the combustion chamber, aligned with the major axis 402 thereof, so that the fuel plume 248 is confined between and guided by the opposing sides of the combustion chamber. Preferably, two injection ports 403 are provided, one at each end of the combustion chamber cavity 400, and aligned with the major axis 402 thereof, and fuel is injected from two opposing injectors 250 through the injection ports.

In some aspects, it is desirable to inject at least one spray of fuel into a combustion chamber having an elongated, generally ellipsoidal shape. It is preferable, however, to inject a pair of opposing sprays of fuel into the turbulent charge air motion generated in the combustion chamber by swirl-plus-squish interactions, where the opposing sprays meet in the combustion chamber and form a cloud of fuel that is well mixed with the compressed charge air due to the turbulence. With reference to FIG. 11, the view is a sectional one at or near the longitudinal midpoint of the cylinder 220, looking directly into the cylinder's bore 221 toward a piston end surface 382 disposed in the bore at a position where it and the unseen piston end surface define the combustion chamber 400. According to the second construction, the combustion chamber 400 is essentially centered longitudinally with respect to the cylinder's axis 223. Fuel injectors 250 are positioned with their nozzle tips 251 disposed at injector ports 265. Each injector nozzle tip has one or more holes through which fuel 248 is injected through a respective injector port, into the combustion chamber 400. Preferably, each injector tip 251 sprays fuel 248 in a diverging pattern that is aligned with and travels through an injection port 403 along the major axis 402 of the ellipsoidal combustion chamber 400, into the central portion of the combustion chamber 400. Preferably, opposing spray patterns of fuel are injected into the turbulent air motion in the combustion chamber 400. In some aspects, the opposing spray patterns meet at or near the center of the combustion chamber and form a cloud of fuel that is mixed with charge air having a complex turbulent motion that includes swirl and tumble components. Preferably, but not necessarily, the fuel injectors 250 are disposed such that their axes A are in alignment with each other and a diametrical direction of the bore 221. This causes the injector tips to be oriented in opposition along a diameter of the cylinder 220 that is aligned with the major axis 402.

Our strategy for producing complex, turbulent bulk air motion from a swirling charge air at the start of ignition in an opposed-piston engine is based upon the formation of a combustion chamber having an elongated tapered shape with a major axis between the end surfaces of two opposed pistons. While there are many ways of forming this combustion chamber shape with a pair of opposed pistons, two constructions have been described and illustrated. Each of these two combustion chamber constructions produces a complex bulk charge air motion in the combustion chamber at the start of injection due to the interaction of the swirling flow in the cylinder at the end of scavenging with the piston end surfaces as the pistons move towards TDC. The overall magnitude of the angular momentum is reduced by the interaction with the piston end surfaces during compression, but the end surface shapes provide mechanisms to apply torques about one or more tumble axes and also confine the charge in the centrally located combustion chamber, which simultaneously modifies the initial swirl and produces tumbling motions as the pistons approach TDC.

The pistons and associated cylinder are manufactured by casting and/or machining metal materials. For example, each of the pistons may be constituted of a skirt assembled to a crown on which a piston end surface is formed. The crown may comprise a high carbon steel such as 41-40 or 43-40, and the skirt may be formed using 4032-T651 aluminum. In such cases, the cylinder preferably comprises a cast iron composition.

Although the invention has been described with reference to preferred constructions, it should be understood that various modifications can be made without departing from the spirit of the invention. Accordingly, the invention is limited only by the following claims.

The invention claimed is:

1. A combustion chamber construction for an internal combustion engine including at least one cylinder (120) with longitudinally-separated exhaust and intake ports (126, 124) and a pair of pistons disposed in opposition to one another in a bore of the cylinder, in which:

the pistons have shaped end surfaces (182a, 182b) that define a combustion chamber (200) having an elongated tapered shape with at least one injection port (203) aligned with a major axis (202) of the combustion chamber when the pistons are near top dead center (TDC) positions in the cylinder; and, the cylinder includes at least one fuel injector port (165) extending in a radial direction of the cylinder at a location aligned with the injection port of the combustion chamber;

in which the elongated tapered shape is defined between a first shape (183) in a first end surface (182*a*) and a second shape (186), complementary to the first shape, in the second end surface (182*b*); and in which the first end surface (182*a*) includes a bowl (183) defining a concave surface and the second end surface (182*b*) includes an elongated cleft (188), symmetrically curved in cross-section and generally elliptical in plan, formed in a convex surface (186).

2. An opposed-piston internal combustion engine including the combustion chamber construction of claim 1.

3. A method for operating an opposed-piston internal combustion engine including the combustion chamber of claim 1 by forming a combustion chamber (200) having an elongated tapered shape between the end surfaces of the pistons as the pistons move toward respective top dead center positions in the bore, generating respective tumbling motions (216) of charge air in the combustion chamber in response to swirling charge air (217), and injecting fuel (148) into the combustion chamber.

4. The method of claim 3, in which injecting a charge of fuel (148) into the combustion chamber includes injecting the fuel along a major axis (187, 202) of the elongated tapered shape.

5. The method of claim 4, in which injecting a charge of fuel into the combustion chamber includes injecting opposing sprays of fuel along the major axis.

6. The method of claim 3, in which generating respective tumble motions includes generating respective counter-rotating tumble motions at opposite ends of the combustion chamber.

7. The method of claim 6, in which injecting a charge of fuel into the combustion chamber includes injecting opposing sprays of fuel along the major axis.

8. The method of claim 7, in which a swirling motion (217) is imposed on charge air admitted into the bore before forming a combustion chamber (200, 400), a squish motion (212, 214) is imposed on swirling charge air as the combustion chamber is formed, and the counter-rotating tumbling motions (216) are generated by interaction between the squish and swirling motions.

9. The method of claim 8, in which injecting a charge of fuel (148) into the charge of air includes injecting opposing sprays of fuel along a tumbling axis (187, 202) of rotation.

10. The method of claim 6, in which a swirling motion (217) is imposed on charge air admitted into the bore before forming a combustion chamber (200, 400), and the counter-rotating tumbling motions (216) are generated by interaction of the swirling motion with the end surfaces (182*a*,182*b*).

11. The method of claim 10, in which injecting a charge of fuel into the charge of air includes injecting opposing sprays of fuel along a tumbling axis of rotation.

12. The combustion chamber construction of claim 1, in which the combustion chamber has a cavity that comprises a concave dome-like cover (183) over an elongate trench (188), the elongate trench being symmetrically curved in cross-section, the concave dome-like cover provided by the bowl of first the first end surface (182*a*) and the elongate trench provided by the second end surface (182*b*).

13. The combustion chamber construction of claim 1, in which the elongated cleft has a major axis that is collinear with a diameter of the second end surface and the elongated cleft is symmetrical about its major axis.

* * * * *